United States Patent
Kwon et al.

(10) Patent No.: US 10,573,947 B2
(45) Date of Patent: *Feb. 25, 2020

(54) ELECTROCHEMICAL BATTERY MAINTAINING OXYGEN CONCENTRATION BY AIR RECIRCULATION

(71) Applicant: Samsung Electronics Co., Ltd., Suwon-si, Gyeonggi-do (KR)

(72) Inventors: Hyukjae Kwon, Suwon-si (KR); Jeongsik Ko, Seongnam-si (KR); Heungchan Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 180 days.

This patent is subject to a terminal disclaimer.

(21) Appl. No.: 15/262,142

(22) Filed: Sep. 12, 2016

(65) Prior Publication Data

US 2017/0117600 A1 Apr. 27, 2017

(30) Foreign Application Priority Data

Oct. 26, 2015 (KR) .................. 10-2015-0148817
Jan. 19, 2016 (KR) .................. 10-2016-0006476

(51) Int. Cl.
*H01M 12/08* (2006.01)
*H01M 8/04089* (2016.01)
*H01M 8/04119* (2016.01)
*H01M 8/0444* (2016.01)
*H01M 8/04746* (2016.01)
*H01M 8/0662* (2016.01)

(52) U.S. Cl.
CPC ......... *H01M 12/08* (2013.01); *H01M 8/0447* (2013.01); *H01M 8/04097* (2013.01); *H01M 8/04164* (2013.01); *H01M 8/04171* (2013.01); *H01M 8/04455* (2013.01); *H01M 8/04753* (2013.01); *H01M 8/04761* (2013.01); *H01M 8/0681* (2013.01); *Y02E 60/128* (2013.01)

(58) Field of Classification Search
CPC .. H01M 12/06; H01M 12/08; H01M 8/04089; H01M 8/04171; H01M 8/0432; H01M 8/04335; H01M 8/04544; H01M 8/04574; H01M 8/04634; H01M 8/04798
See application file for complete search history.

(56) References Cited

U.S. PATENT DOCUMENTS

| | | | |
|---|---|---|---|
| 5,560,999 A | 10/1996 | Pedicini et al. | |
| 2002/0160247 A1* | 10/2002 | Tzeng | H01M 2/14 429/405 |
| 2006/0257708 A1 | 11/2006 | Keefer et al. | |
| 2010/0021778 A1 | 1/2010 | Steinshnider et al. | |
| 2012/0040253 A1 | 2/2012 | Hermann | |
| 2012/0041628 A1 | 2/2012 | Hermann et al. | |
| 2014/0272611 A1* | 9/2014 | Albertus | H01M 12/08 429/405 |
| 2017/0012333 A1 | 1/2017 | Kwon et al. | |

FOREIGN PATENT DOCUMENTS

| | | |
|---|---|---|
| DE | 102014018232 B3 | 10/2015 |
| JP | 2012204300 A | 10/2012 |
| WO | 94/25991 A2 | 11/1994 |
| WO | 2016087194 A3 | 6/2016 |

OTHER PUBLICATIONS

Gallagher et al., "Quantifying the promise of lithium-air batteries for electric vehicles", Energy & Environmental Science, vol. 7, 2014, pp. 1555-1563.
European Search Report for European Patent Application No. 16194774.2 dated Mar. 1, 2017.

* cited by examiner

*Primary Examiner* — Ladan Mohaddes
(74) *Attorney, Agent, or Firm* — Cantor Colburn LLP

(57) ABSTRACT

An electrochemical battery including: a battery module comprising at least one electrochemical cell; an air supplier configured to supply air to the battery module and constantly maintain an oxygen concentration in the air that is supplied to the battery module; and an air recirculator configured to recirculate air exhausted from the battery module, wherein the battery module comprises an air inlet port though which air is introduced from the air supplier, and an air outlet port through which air remaining after a reaction in the at least one electrochemical cell is exhausted, and wherein the air recirculator is configured to recirculate the air exhausted through the air outlet port of the battery module to the air inlet port of the battery module.

26 Claims, 9 Drawing Sheets

ELECTROCHEMICAL BATTERY MAINTAINING OXYGEN CONCENTRATION BY AIR RECIRCULATION

CROSS-REFERENCE TO RELATED APPLICATIONS

This application claims priority to and the benefit of Korean Patent Application No. 10-2015-0148817, filed on Oct. 26, 2015, and Korean Patent Application No. 10-2016-0006476, filed on Jan. 19, 2016, in the Korean Intellectual Property Office, and all the benefits accruing therefrom under 35 U.S.C. § 119, the contents of which are incorporated herein in their entirety by reference.

BACKGROUND

1. Field

The present disclosure relates to an electrochemical battery, and more particularly, to an electrochemical battery which is capable of efficiently and constantly maintaining an oxygen concentration in a battery module by recirculating air exhausted from the battery module.

2. Description of the Related Art

Of electrochemical batteries, a metal air battery and a fuel cell have a common feature in that air including oxygen is supplied to a cathode. For example, the metal air battery includes a plurality of metal air cells, and each of the metal air cells includes an anode capable of intercalating and deintercalating ions and a cathode using oxygen in air as an active material. A reduction/oxidation reaction of oxygen introduced from the outside occurs at the cathode, and an oxidation/reduction reaction of a metal occurs at the anode. The metal air battery changes chemical energy generated when the oxidation/reduction reaction occurs into electrical energy and outputs the electrical energy. The metal air battery absorbs oxygen during discharging and emits oxygen during charging.

In addition, the fuel cell is a device that directly changes chemical energy of a fuel into electrical energy through an electrochemical reaction and is a kind of a power generation device that is capable of continuously generating electricity so long as a fuel is supplied thereto. In the fuel cell, when air including oxygen is supplied to a cathode, and a fuel such as methanol or hydrogen is supplied to an anode, an electrochemical reaction occurs through an electrolyte film between the cathode and the anode, thereby generating electricity.

To provide improved performance, improve configurations of the electrochemical battery are needed.

SUMMARY

Additional aspects will be set forth in part in the description which follows and, in part, will be apparent from the description, or may be learned by practice of the presented embodiments.

According to an aspect of an embodiment, an electrochemical battery includes: a battery module including at least one electrochemical cell; an air supplier configured to supply air to the battery module and constantly maintain an oxygen concentration in the air that is supplied to the battery module; and an air recirculator configured to recirculate air exhausted from the battery module, wherein the battery module includes an air inlet port though which air is introduced from the air supplier, and an air outlet port through which air remaining after a reaction in the at least one electrochemical cell is exhausted, and wherein the air recirculator is configured to recirculate the air exhausted through the air outlet port of the battery module to the air inlet port of the battery module.

The air recirculator may include an air flow passage configured to transfer the air exhausted through the air outlet port to the air supplier.

The air supplier may include: an air suction device configured to suction air from the outside; and an oxygen generator configured to generate oxygen by separating oxygen from the suctioned air.

The air flow passage may be connected between the air outlet port of the battery module and the oxygen generator.

The air supplier may further include a moisture remover configured to remove moisture from the suctioned air, and the air dried by the moisture remover and the air exhausted from the battery module may be mixed with each other and be supplied to the oxygen generator.

The oxygen generator may be further configured to filter oxygen via an adsorption/desorption method or a membrane method.

The adsorption/desorption method may include at least one selected from a pressure swing adsorption (PSA) method, a thermal swing adsorption (TSA) method, a pressure thermal swing adsorption (PTSA) method, and a vacuum swing adsorption (VSA) method.

The oxygen generator may include: a first outlet port connected to the battery module to supply the separated oxygen to the battery module; and a second outlet port configured to exhaust a gas remaining after oxygen is separated.

The air supplier may be further configured to reflux at least a portion of a gas exhausted through the first outlet port to the oxygen generator.

The air supplier may further include a moisture remover configured to remove moisture from the suctioned air. The air supplier may be further configured such that the refluxed air is mixed with the air dried by the moisture remover and the air exhausted from the battery module, and the mixed air is supplied to the oxygen generator.

The air recirculator may include an air flow passage configured to directly transfer the air exhausted through the air outlet port to the air inlet port.

The air recirculator may further include a membrane disposed on the air flow passage so as to separate oxygen from the air that is exhausted through the air outlet port and is recirculated to the air inlet port.

The membrane may be configured to supply the separated oxygen to the air inlet port and exhaust gases except for oxygen to the outside.

The air recirculator may further include an air pump disposed on the air flow passage so as to allow air to flow from the air outlet port to the air inlet port.

The air recirculator may further include a valve configured to open or close the air flow passage.

The electrochemical battery may further include a controller configured to control the air supplier and the air recirculator to constantly maintain the oxygen concentration in the air supplied to the battery module.

The controller may control the air supplier and the air recirculator to constantly maintain the oxygen concentration in the air supplied to the battery module in a range between a value equal to or greater than about 30% and a value less than about 100% based on a total content of the air supplied to the battery module.

The electrochemical battery may further include an oxygen sensor configured to measure at least one selected from the oxygen concentration in the air supplied to the battery module, an oxygen concentration in the battery module, and the oxygen concentration in the air exhausted from the battery module.

When the oxygen concentration in the battery module is less than a preset concentration, the controller may control the air supplier to increase the oxygen concentration in the air supplied to the battery module, and when the oxygen concentration in the battery module is greater than the preset concentration, the controller may control the air supplier to decrease the oxygen concentration in the air supplied to the battery module.

The controller may control the air recirculator to recirculate or not to recirculate the air exhausted from the battery module according to the oxygen concentration in the air exhausted from the battery module.

When the oxygen concentration in the air exhausted from the battery module is less than an oxygen concentration in the atmosphere, the controller may control the air recirculator not to recirculate the air exhausted from the battery module.

The air recirculator may include an air flow passage configured to transfer the air exhausted though the air outlet port to the air supplier and a valve configured to open or close the air flow passage.

The battery module may include at least one metal air cell configured to use oxygen in air as a cathode active material or at least one fuel cell configured to change chemical energy of a fuel into electrical energy through an electrochemical reaction.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
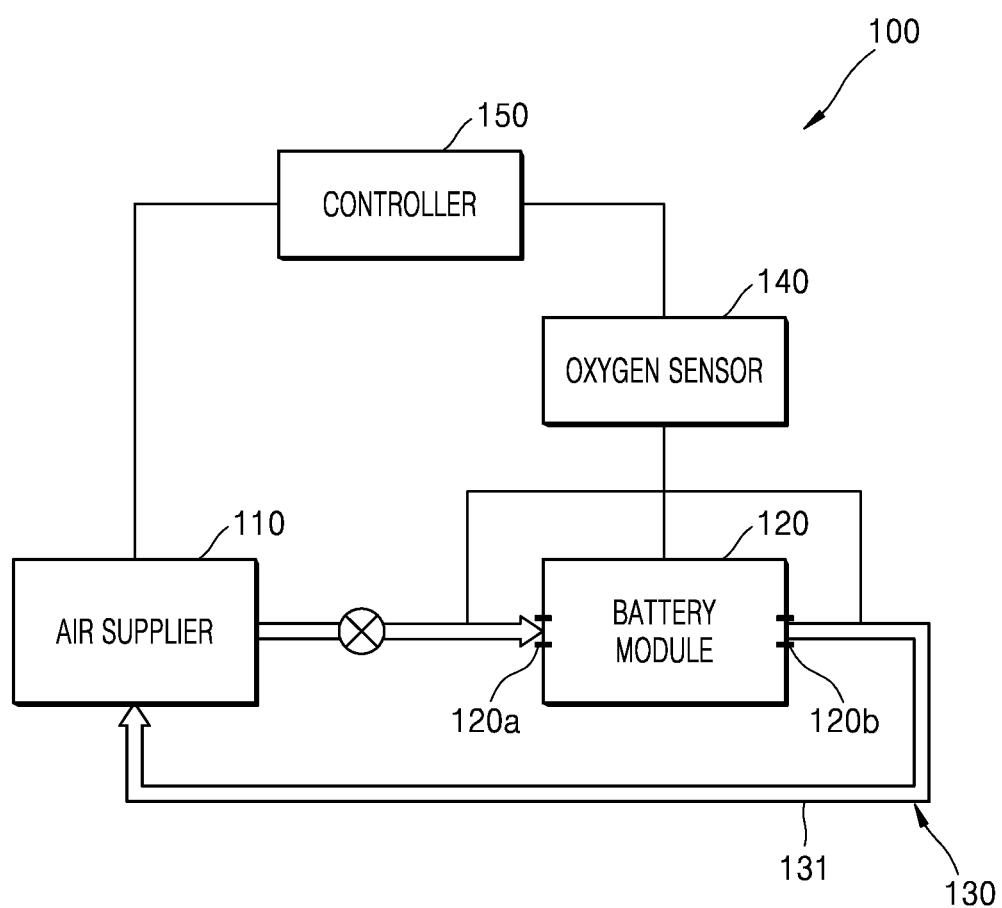
FIG. 1 is a schematic block diagram of an electrochemical battery according to an embodiment.

Hereinafter, an electrochemical battery maintaining an oxygen concentration by air recirculation will be described in detail with reference to the accompanying drawings, wherein like reference numerals refer to like elements throughout. In the drawings, the dimensions of elements are exaggerated for clarity of the inventive concept. The following embodiments are merely examples, and various modifications may be made thereto. It will be understood that when an element is referred to as being "on," "connected to" or "coupled to" another element, it may be directly on, connected or coupled to the other element, or intervening elements may be present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Gas concentrations are in volume percent. For example, an oxygen concentration of 21% refers to an oxygen concentration of 21% by volume.

FIG. 1 is a schematic block diagram of an electrochemical battery 100 according to an embodiment. Referring to FIG. 1, the electrochemical battery 100 according to the present embodiment may include a battery module 120 including an electrochemical cell, an air supplier 110 configured to supply air to the battery module 120, an air recirculator 130 configured to recirculate air exhausted from the battery module 120, and a controller 150 configured to control operation of the air supplier 110 and the air recirculator 130. In an embodiment, the controller is configured to maintain a constant oxygen concentration in the air supplied to the battery module 120. The controller may be configured to operate intermittently or continuously. In addition, the electrochemical battery 100 may further include an oxygen sensor 140 configured to measure an oxygen concentration. The oxygen sensor 140 may be disposed to measure at least one selected from an oxygen concentration in air supplied to the battery module 120, an oxygen concentration in the battery module 120, and an oxygen concentration in air exhausted from the battery module 120.

The battery module 120 may include at least one metal air cell using oxygen in air as a cathode active material or at least one fuel cell which is configured to convert chemical energy of a fuel into electrical energy through an electrochemical reaction. For example, in an embodiment where the battery module 120 comprises at least one metal air cell, each metal air cell in the battery module 120 may generate electricity by using an oxidation of a metal and a reduction of oxygen. For example, when a metal of the metal air cell is lithium (Li), the metal air cell may generate electricity through a reaction in which lithium (Li) reacts with oxygen to generate lithium oxide ($Li_2O_2$) during discharge. On charge, lithium (Li) may be reduced from lithium oxide and oxygen may be generated. Besides lithium (Li), various other metals such as sodium, zinc, potassium, calcium, magnesium, iron, or aluminum may be used, and a reaction principal thereof may be substantially the same as lithium (Li). For example, the battery module 120 may include at least one selected from a sodium (Na) air cell, zinc (Zn) air cell, potassium (K) air cell, calcium (Ca) air cell, magnesium (Mg) air cell, iron (Fe) air cell, and an aluminum (Al) air cell, and alloy air cell including at least one of Li, Na, Zn, K, Ca, Mg, and Fe.

In addition, in an embodiment in which the electrochemical battery cell of the battery module 120 is the fuel cell, each fuel cell in the battery module 120 may generate electricity by directly changing chemical energy generated through an oxidation of a fuel into electrical energy. For example, when air including oxygen is supplied to a cathode, and a fuel such as methanol or hydrogen is supplied to an anode, an electrochemical reaction occurs through an electrolyte film between the cathode and the anode, thereby generating electricity.

As is further described above, since the battery module 120 uses oxygen during generation of electricity, it is desirable to continuously supply oxygen to the battery module 120. The supply of oxygen to the battery module 120 may be performed by supplying air in the atmosphere to the battery module 120 or supplying oxygen to the battery module 120 from an oxygen source such as liquid oxygen. When air from the atmosphere is supplied to the battery module 120, since an oxygen concentration in the atmosphere is only 21%, in order to sufficiently supply oxygen, air in the atmosphere is usually compressed to a pressure of about 0.5 megaPascals (MPa) and is supplied to the battery module 120. When the high pressure compressed air is supplied to the battery module 120, a pressure in the battery module 120 is increased. For example, when the pressure in the battery module 120 is greater than about 0.2 MPa, the electrochemical cell may be mechanically abraded and damaged. In addition, since energy is consumed for compressing air, the total efficiency of the electrochemical battery 100 may be reduced.

The air supplier 110 according to the present embodiment may be configured to control the oxygen concentration in the air supplied to the battery module 120 and may avoid the supplying compressed air to the battery module 120. For example, after air in the atmosphere is suctioned, the air supplier 110 may increase the oxygen concentration in the air supplied to the battery module 120 by removing moisture and nitrogen from the air. In particular, the air supplier 110 may be configured to improve the performance of the electrochemical battery 100 by adjusting the oxygen concentration in the air supplied to the battery module 120.

The air recirculator 130 may be configured to recirculate air by supplying, to the air supplier 110, at least a portion of air exhausted from the battery module 120. For example, the battery module 120 may include an air inlet port 120a through which air is introduced from the air supplier 110 and an air outlet port 120b through which air remaining after a reaction in the electrochemical battery cell is exhausted. The air recirculator 130 may include an air flow passage 131 configured for transferring the air exhausted through the air outlet port 120b to the air supplier 110. In order to cause a sufficient reaction or a reaction under a uniform current density in the electrochemical cell, the air supplier 110 may supply, to the battery module 120, an oxygen amount that is greater than an oxygen amount used by the electrochemical cell. Therefore, unreacted residual oxygen may be included in the air exhausted through the air outlet port 120b. The air recirculator 130 may reduce a load of the air supplier 110 by recirculating, to the battery module 120, the air exhausted through the air outlet port 120b of the battery module 120.

The controller 150 may adjust the oxygen concentration in the air supplied to the battery module 120 by controlling an operation of the air supplier 110 and the air recirculator 130. For example, a feedforward control method that does not consider the state of the battery module 120 may be used. The oxygen concentration in the air supplied by the air supplier 110 may be fixed to a specific value, and the controller 150 may control the air supplier 110 such that the air supplier 110 supplies air having a specific oxygen concentration regardless of an actual oxygen concentration in the battery module 120.

In addition, the controller 150 may control the operation of the air supplier 110 and the air recirculator 130 in a feedback method, based on the oxygen concentration in the air supplied to the battery module 120, the oxygen concentration in the battery module 120, and the oxygen concentration in the air exhausted from the battery module 120. For example, the controller 150 may receive a measurement result from the oxygen sensor 140. When the oxygen concentration in the battery module 120 is less than a preset concentration, the controller 150 may control the air supplier 110 to increase the oxygen concentration in the air supplied to the battery module 120. In addition, when the oxygen concentration in the battery module 120 is greater than the preset concentration, the controller 150 may control the air supplier 110 to decrease the oxygen concentration in the air supplied to the battery module 120.

Hereinafter, an oxygen concentration for improving operation of the electrochemical battery 100 will be further disclosed. For example, FIGS. 2 to 4 are graphs showing a change in performance of the electrochemical battery 100 according to the oxygen concentration in the air supplied to the battery module 120 in an embodiment in which the electrochemical cell of the battery module 120 is the metal air cell.

Figure 2:
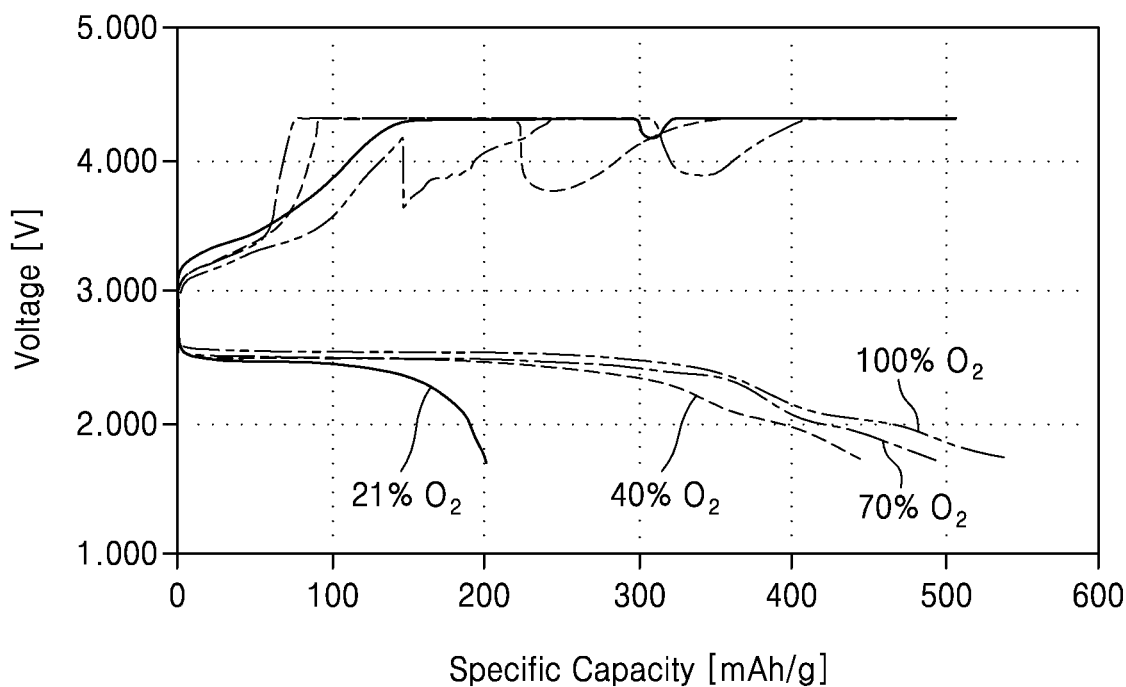
FIG. 2 is a graph of voltage (volts, V) versus specific capacity (milliampere hours per gram, mAh/g) showing charging and discharging performance of an electrochemical battery according to an oxygen concentration in a case where the battery module is a metal air cell.

FIG. 2 is a graph showing charging and discharging performance of the electrochemical battery 100 according to an oxygen concentration in an embodiment in which the electrochemical cell of the battery module 120 is, for example, the metal air cell. In the graph of FIG. 2, lithium metal was used as an anode. A current density was maintained to about 0.24 milliampere hours per square centimeter (mAh/cm$^2$) during discharge, and discharging was performed until a voltage dropped to about 1.7 V. In addition, an applied voltage was about 4.3 V during charge. Referring to the graph of FIG. 2, until the voltage dropped to about 1.7 V, when the oxygen concentration was about 100%, a discharge capacity was about 550 milliampere hours per gram (mAh/g). When the oxygen concentration was about 21%, the discharge capacity was about 200 mAh/g. The discharge capacity when the oxygen concentration is about 70% is greater than the discharge capacity when the oxygen concentration is about 40%. The discharge capacity at an oxygen concentration of about 40% was about 80% of the discharge capacity when the oxygen concentration was about 100%, and the discharge capacity when the oxygen concentration was about 70% was not significantly different from the discharge capacity when the oxygen concentration was about 100%.

Figure 3:
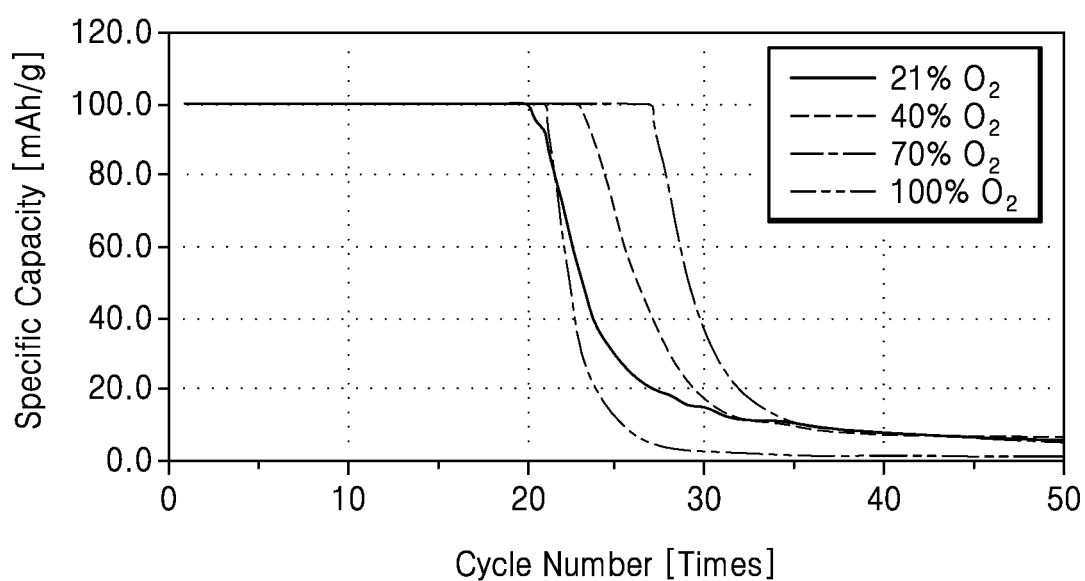
FIG. 3 is a graph of specific capacity (milliampere hours per gram, mAh/g) versus cycle number showing a charge and discharge cycle of a metal air cell at various oxygen concentrations.

FIG. 3 is a graph showing a charge and discharge cycle of the electrochemical battery 100 according to an oxygen concentration in a case where the electrochemical cell of the battery module 120 is, for example, the metal air cell. In the graph of FIG. 3, lithium metal was used as an anode. A current density was maintained to about 0.24 mAh/cm$^2$ during discharge, and discharge was performed until a voltage dropped to about 1.7 V. In addition, an applied voltage was about 4.3 V during charge. It was shown that after charging and discharging were repeated in a state in which a discharge capacity was maintained to about 100 mAh/g, a charge and discharge cycle at an oxygen concentration of about 21% was similar to a charge and discharge cycle at an oxygen concentration of about 100%, and after charging and discharging were performed about 20 times, performance degradation occurred at the oxygen concentrations of about 21% and about 100%. The charge and discharge cycle was the provided the greatest capacity when the oxygen concentration was about 70%.

Figure 4:
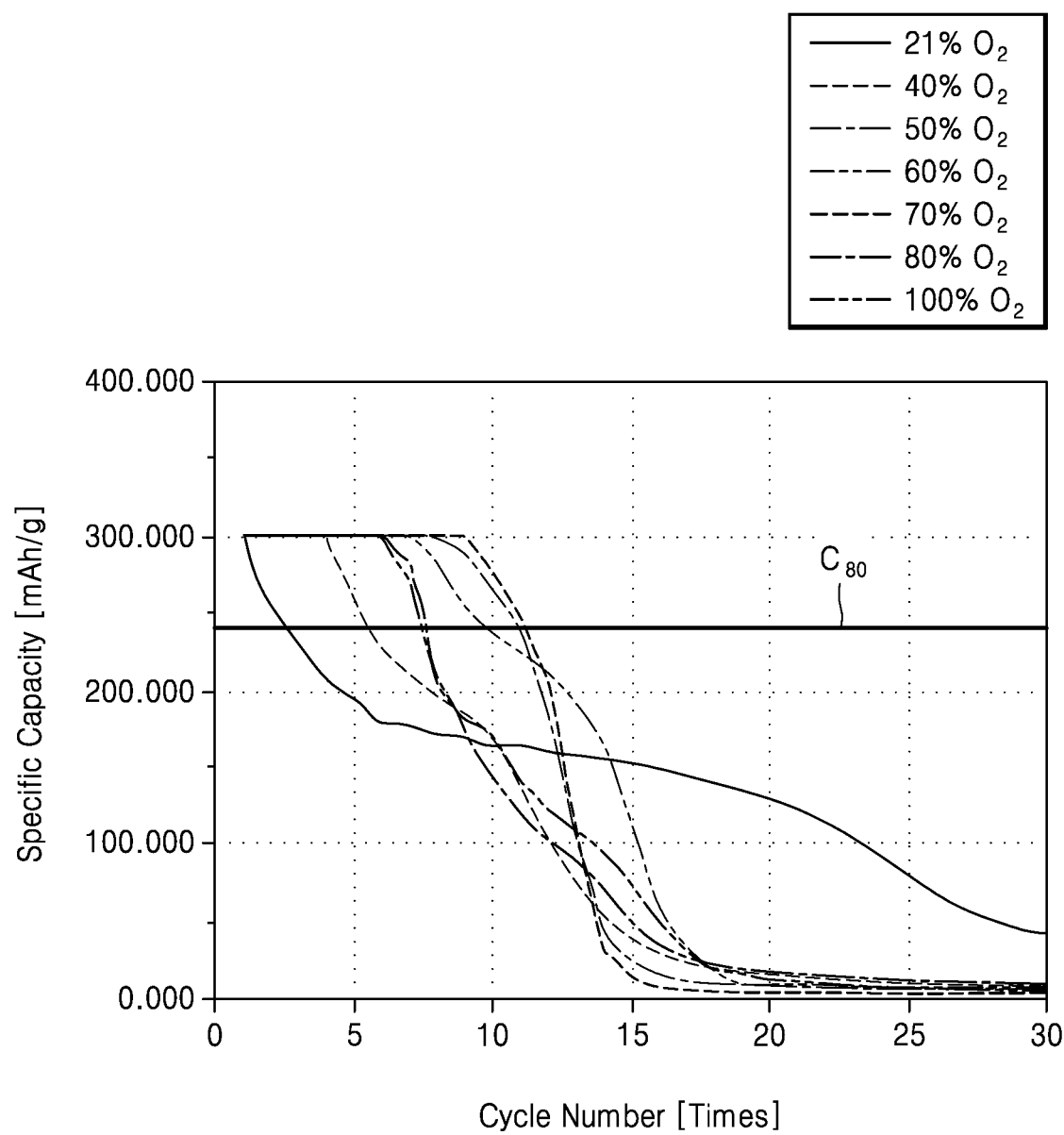
FIG. 4 is a graph specific capacity (milliampere hours per gram, mAh/g) versus cycle number showing charge and discharge cycles of a metal air battery cell at various oxygen concentrations.

FIG. 4 is a graph showing a charge and discharge cycle of the electrochemical battery 100 according to an oxygen concentration in an embodiment in which the electrochemical cell of the battery module 120 is, for example, the metal air cell and showing the results in which charging and discharging were repeated in a state in which a discharge capacity was maintained at about 300 mAh/g. Until a specific capacity reached a selected level of about 80% of an initial specific capacity (e.g., about 240 mAh/g), the cycles with the greatest capacity where when oxygen concentrations of about 50% and about 70% were used. When the oxygen concentration was about 21%, the discharge capacity of about 300 mAh/g was recorded only once, and the discharge capacity was reduced from a second charge and discharge cycle. A specific capacity at oxygen concentrations of about 80% and about 100% reached a level of about 80% of an initial specific capacity from a seventh charge and discharge cycle.

From the above-described results, when the oxygen concentration is about 100%, the discharge efficiency of the electrochemical battery 100 may be temporarily improved, but it may be seen that as charging and discharging are repeated, degradation of the electrochemical battery 100 is rapidly accelerated. While not wanting to be bound by theory, this degradation is understood to occur because an electrode, an electrolyte, and the like are easily oxidized due to excess oxygen. Therefore, when 100% oxygen is supplied to the electrochemical battery 100, a battery life of the electrochemical battery 100 may be shortened. In addition, when the oxygen concentration is about 21%, due to the lack of oxygen, the discharge efficiency and the cycle life of the electrochemical battery 100 were reduced.

As can be seen from the above, in order to improve the performance and the battery life of the electrochemical battery 100, the electrochemical battery 100 may operate at an oxygen concentration that is greater than an oxygen concentration in the atmosphere, i.e., greater than about 21%, and is less than about 100%. For example, the controller 150 may adjust the oxygen concentration in the air supplied to the battery module 120 of the electrochemical battery 100 so to maintain an oxygen concentration in a range between a value equal to or greater than about 30% and a value less than about 100%. More specifically, the controller 150 may adjust the oxygen concentration in the air supplied to the battery module 120 so as to maintain in an oxygen concentration in a range between a value equal to or greater than about 35% and a value less than about 95% or in a range between about 50% and about 80%.

In FIGS. 2 to 4, while the embodiment where the electrochemical cell of the battery module 120 is the metal air cell, even when the electrochemical cell of the battery module 120 is a fuel cell, the oxygen concentration in the air supplied to the battery module 120 may be provided in an appropriate range for the fuel cell. For example, when the battery module 120 includes a fuel cell, an oxygen concentration of about 35% to about 95%, about 40% to about 90%, or about 45% to about 85% maybe provided.

In order to maintain the oxygen concentration in the air supplied to the battery module 120 as described above, the controller 150 may control the operation of the air supplier 110 and the air recirculator 130. For example, the controller 150 may control the air supplier 110 and the air recirculator 130 to maintain the oxygen concentration in the battery module 120 to a preset specific value. At this time, the controller 150 may compare an actual oxygen concentration measured by the oxygen sensor 140 with a target oxygen concentration and control the air supplier 110 and the air recirculator 130 based on a result of the comparison. For example, the controller 150 may control the air supplier 110 to adjust an air amount supplied to the battery module 120 and oxygen concentration in the air. The controller 150 may control the air recirculator 130 to adjust an amount of air recirculated in the air supplier 110 among the air exhausted through the air outlet port 120b.

Figure 5:
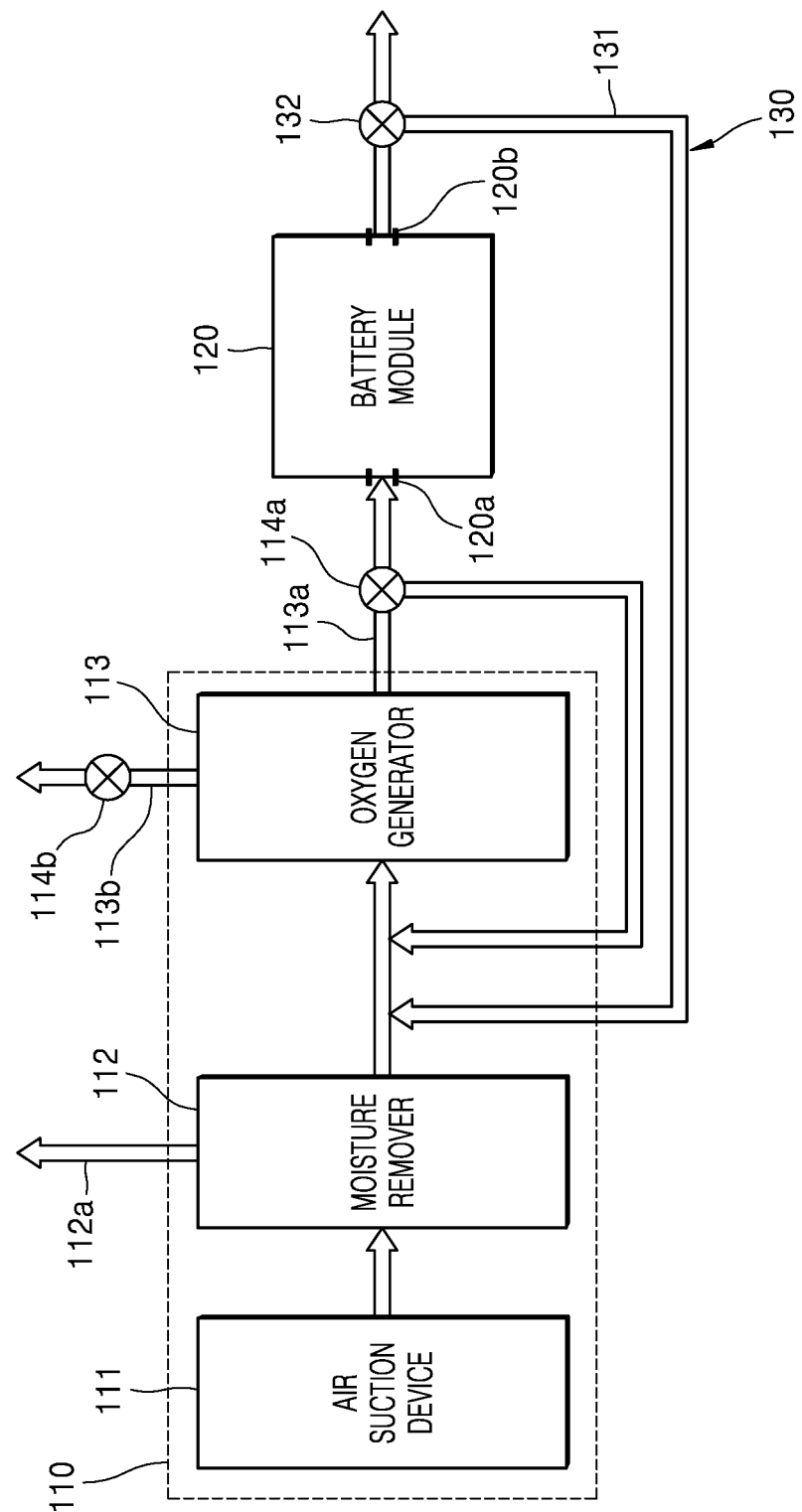
FIG. 5 is a schematic block diagram of an air supplier and an air recirculator of the electrochemical battery illustrated in FIG. 1, according to an embodiment.

FIG. 5 is a schematic block diagram of an air supplier 110 and an air recirculator 130 of the electrochemical battery 100 illustrated in FIG. 1, according to an embodiment. Referring to FIG. 5, the air supplier 110 may include an air suction device 111 configured to suction air from the outside, a moisture remover 112 configured to remove moisture from the suctioned air, and an oxygen generator 113 configured to generate oxygen by separating oxygen from the suctioned air. The air suction device 111 may be configured to adjust an air suction amount under control of the controller 150. The moisture remover 112 is illustrated in FIG. 5 as being disposed in front of the oxygen generator 113 in an air flow direction, but a placement order may be changed between the oxygen generator 113 and the moisture remover 112. For example, the oxygen generator 113 may be disposed in front of the moisture remover 112 in the air flow direction. In addition, the oxygen generator 113 and the moisture remover 112 may be integrated into a single assembly. Hereinafter, the embodiment where the moisture remover 112 is disposed in front of the oxygen generator 113 in the air flow direction will be further described for convenience.

The moisture remover 112 may be configured to remove moisture from outside air suctioned by the air suction device 111. In a case where an electrochemical cell of a battery module 120 is a metal air cell, when moisture is present in the air, lithium hydroxide may be generated during a discharging of the electrochemical cell. Accordingly, an energy density of the electrochemical battery 100 may be reduced and a battery life thereof may be shortened. In this regard, the moisture remover 112 may be referred to as an air drier. Although not illustrated in detail, the moisture remover 112 may include, for example, an adsorber configured to adsorb moisture in air and a heater configured to heat the adsorber and desorb the moisture adsorbed to the adsorber. The moisture desorbed from the adsorber may be exhausted to the outside through a moisture outlet port 112a.

However, in an embodiment in which the electrochemical cell of the battery module 120 is a fuel cell, the moisture remover 112 may be omitted from the air supplier 110 if desired. Alternatively, a humidifier may be used in place of the moisture remover 112 if desired.

Air dried by the moisture remover 112 may be supplied to the oxygen generator 113. The oxygen generator 113 may increase an oxygen concentration in air by removing impurities such as carbon dioxide and nitrogen included in the dried air. For example, the oxygen generator 113 may be configured to filter oxygen via an adsorption/desorption method or a membrane method. The oxygen, which is filtered by the oxygen generator 113 via the adsorption/desorption method or the membrane method, may be supplied to the battery module 120 through a first outlet port 113a. To this end, the first outlet port 113a of the oxygen generator 113 may be connected to an air inlet port 120a of the battery module 120. A gas remaining after oxygen is separated may be exhausted to the outside through a second outlet port 113b.

As illustrated in FIG. 5, the exhaust gas, which is exhausted through the first outlet port 113a or the second outlet port 113b, may be refluxed to the oxygen generator 113 so to facilitate selection of the oxygen concentration to a desired concentration. For example, a portion of the air, which is supplied to the battery module 120 through the first outlet port 113a, may be refluxed to the oxygen generator 113. To this end, a first valve 114a may be disposed at a branch point of a reflux path, which is connected to the oxygen generator 113 through the first outlet port 113a. The controller 150 may control the first valve 114a to adjust an amount of the air which is refluxed from the first outlet port 113a to the oxygen generator 113. In the same manner, a portion of the air, which is exhausted through the second outlet port 113b, may be refluxed to the oxygen generator 113. To this end, a second valve 114b may be disposed at a branch point of a reflux path, which is connected to the oxygen generator 113 through the second outlet port 113b. The controller 150 may control the second valve 114b to adjust an amount of the air which is refluxed from the second outlet port 113b to the oxygen generator 113.

In addition, an air flow passage 131 of the air recirculator 130 may be disposed to supply to the oxygen generator 113 air exhausted through an air outlet port 120b of the battery module 120. Therefore mixed air of the dried outside air supplied through the air suction device 111 and the moisture remover 112 and the air exhausted through the air outlet port 120b of the battery module 120 may be supplied to the oxygen generator 113. Since air is additionally supplied from the air outlet port 120b of the battery module 120, the air suction device 111 may suction an oxygen amount that is less than an oxygen amount consumed by the battery module 120. Accordingly, using this configuration selection of an air amount supplied to the oxygen generator 113 from the air outlet port 120b may be controlled. To this end, the air recirculator 130 may further include a third valve 132 disposed at the air flow passage 131. The controller 150 may control the third valve 132 to adjust the air amount supplied to the oxygen generator 113 from the air outlet port 120b. The third valve 132 may be completely opened/closed or partially opened under control of the controller 150. In addition, when a portion of the air supplied to the battery module 120 from the first outlet port 113a is refluxed to the oxygen generator 113, the refluxed air may be mixed with the air dried by the moisture remover 112 and the air exhausted from the battery module 120, and the mixed air may be supplied to the oxygen generator 113.

Figure 6:
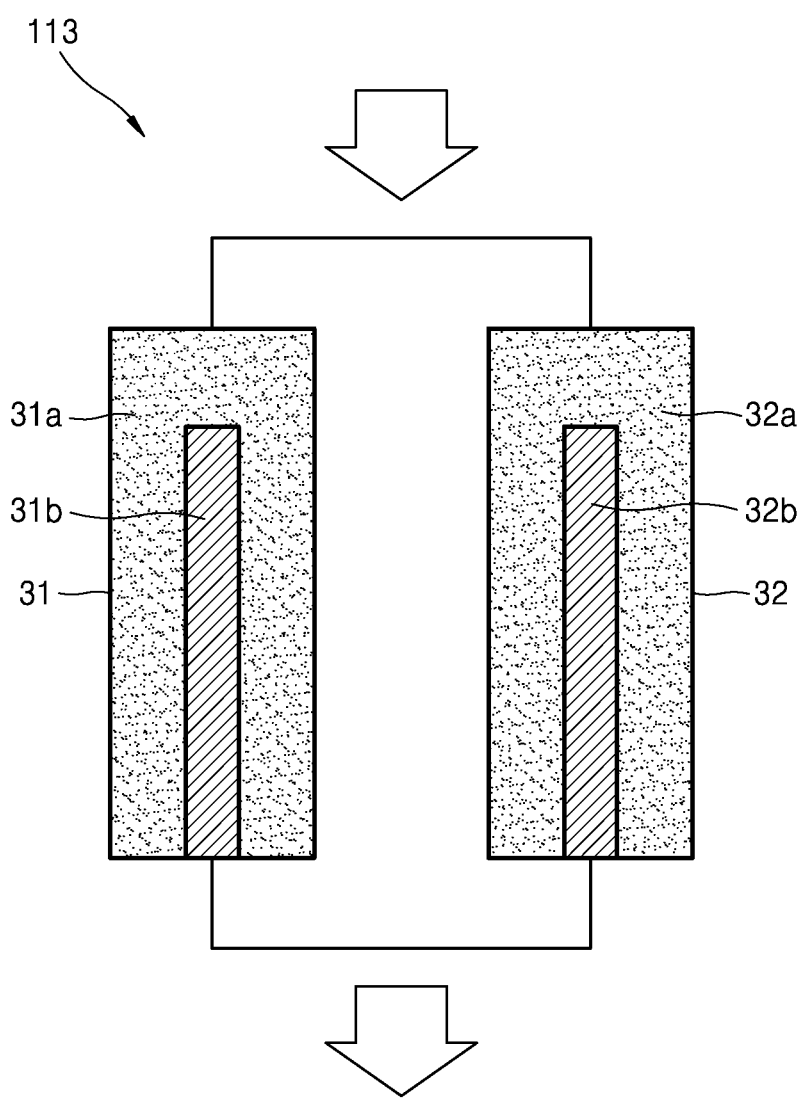
FIG. 6 is a schematic block diagram of an oxygen generator of the air supplier illustrated in FIG. 5, according to an embodiment.

FIG. 6 is a schematic block diagram of an oxygen generator 113 of the air supplier 110 illustrated in FIG. 5, according to an embodiment. The oxygen generator 113 illustrated in FIG. 6 may be configured to filter oxygen via an adsorption/desorption method. In this case, the air supplier 110 may adjust the oxygen concentration in the air supplied to the battery module 120 by adjusting an adsorption amount of nitrogen in the air under control of the controller 150. For example, referring to FIG. 6, the oxygen generator 113 may include a first adsorber 31 and a second adsorber 32, which are disposed in parallel to each other. The first adsorber 31 may include a first adsorbent 31a and a first recycler 31b. The second adsorber 32 may include a second adsorbent 32a and a second recycler 32b.

The first adsorbent 31a and the second adsorbent 32a may function to adsorb impurities such as nitrogen in air. For example, the first adsorbent 31a and the second adsorbent 32a may include at least one selected from zeolite LiX, alumina, a metal-organic framework (MOF), and a zeolite imidazolate framework (ZIF). The MOF may include a metal ion or a metal cluster which is coordinated to an organic molecule and may comprise a crystalline compound forming a primary, secondary, or tertiary porous structure. In addition, the ZIF may comprise a nanoporous compound including a tetrahedral cluster of the formula $MN_4$ that is linked by an imidazolate ligand (where M is a metal).

The first recycler 31b and the second recycler 32b may function to recycle the saturated first adsorbent 31a and the saturated second adsorbent 32a, respectively. In order to recycle the saturated first adsorbent 31a and the saturated second adsorbent 32a, the first recycler 31b and the second recycler 32b may be configured to adjust an inner pressure or temperature of the first adsorber 31 and an inner pressure or temperature of the second adsorber 32, respectively.

The oxygen generator 113 having the aforementioned structure may operate, for example, in a pressure swing adsorption (PSA) method. For example, impurities such as nitrogen may be adsorbed to the first adsorbent 31a by increasing the inner pressure of the first adsorber 31. The remaining air having an increased oxygen concentration may be exhausted from the first adsorber 31 to the first outlet port 113a. Also, the nitrogen adsorbed to the second adsorbent 32a may be desorbed from the second adsorbent 32a by decreasing the inner pressure of the second adsorber 32, and the desorbed nitrogen may be exhausted from the second adsorber 32 to the second outlet port 113b. When the first adsorbent 31a is saturated, the inner pressure of the first adsorber 31 may be decreased, and the inner pressure of the second adsorber 32 may be increased. In this case, a desorbing operation may be performed in the first adsorber 31, and an adsorbing operation may be performed in the second adsorber 32. In such a manner, the first adsorber 31 and the second adsorber 32 may alternately operate. At this time, the oxygen concentration in the air supplied to the battery module 120 may be adjusted by adjusting the inner pressure of each of the first adsorber 31 and the second adsorber 32.

However, an operation manner of the oxygen generator 113 is not limited to the PSA method, and any suitable method may be used. For example, in addition to the PSA method, the oxygen generator 113 may be configured to operate in at least one selected from a thermal swing adsorption (TSA) method, a pressure thermal swing adsorption (PTSA) method, and a vacuum swing adsorption (VSA) method. The PSA method means a technology of primarily adsorbing or capturing a specific gas to the first adsorbent 31a and the second adsorbent 32a at a high partial pressure, and desorbing or exhausting the specific gas when the partial pressure is decreased. In addition, the TSA method means a technology of primarily adsorbing or capturing a specific gas to the first and second adsorbents 31a and 32a at room temperature, and desorbing or exhausting the specific gas when the temperature is increased. The PTSA method means a technology in which the PSA method and the TSA method are combined. Finally, the VSA method means a technology of primarily adsorbing or capturing a specific gas to the first and second adsorbents 31a and 32a at about an atmospheric pressure, and desorbing or exhausting the specific gas under a vacuum.

Figure 7:
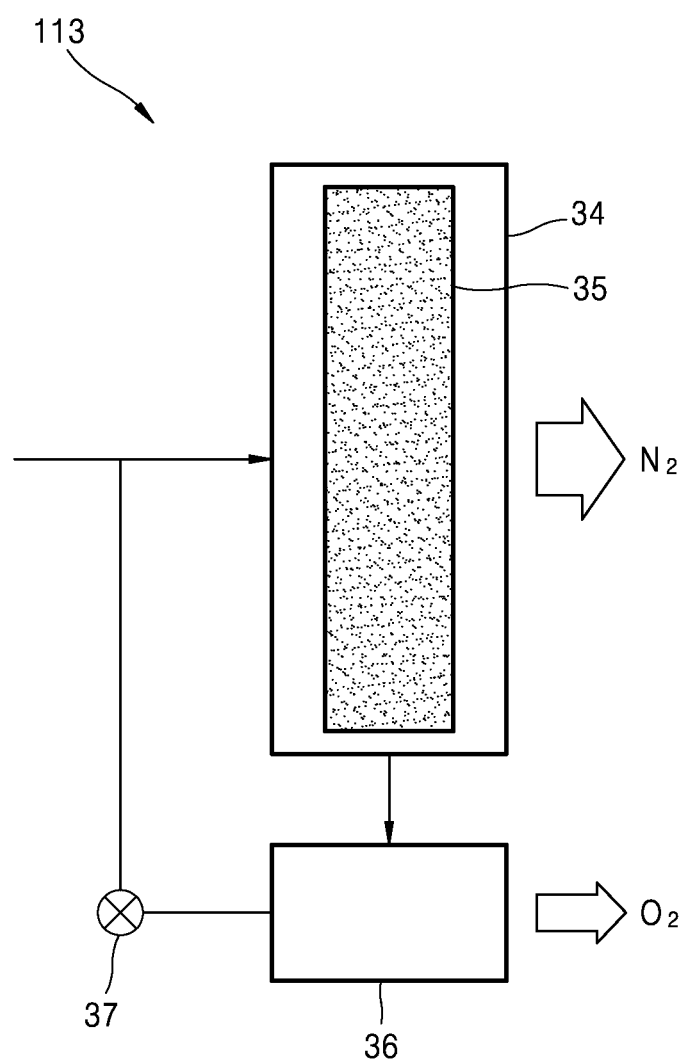
FIG. 7 is a schematic block diagram of an oxygen generator of the air supplier illustrated in FIG. 5, according to another embodiment.

FIG. 7 is a schematic block diagram of an oxygen generator 113 of the air supplier 110 illustrated in FIG. 5, according to another embodiment. The oxygen generator 113 illustrated in FIG. 7 may be configured to filter oxygen via a membrane method. Referring to FIG. 7, the oxygen generator 113 may include a pump 36 and an oxygen separation module 34 to be configured to separate nitrogen and oxygen in air. A membrane 35 may be disposed within the oxygen separation module 34 to selectively separate oxygen. One membrane 35 is illustrated in FIG. 7 for convenience, but a plurality of membranes 25, e.g., about 2 to about 100 membranes, may be disposed in a multi-layered structure. For example, the membrane 35 may include $Ba_{0.5}Sr_{0.5}Co_{0.8}Fe_{0.2}O_{3-\delta}$ (BSCF oxide).

The air dried by the moisture remover 112 may be supplied to the oxygen separation module 34, and the membrane 35 in the oxygen separation module 34 may filter oxygen in air. According to demand, in order to improve separation efficiency by sufficiently supplying air to the oxygen separation module 34, an air compressor may be further disposed between the moisture remover 112 and the oxygen separation module 34. A gas remaining after oxygen is separated in the oxygen separation module 34 may be exhausted to the outside through the second outlet port 113b. The pump 36 may supply oxygen to the battery module 120 through the first outlet port 113a by emitting oxygen from the oxygen separation module 34. At this time, in order to adjust the oxygen concentration in the air supplied to the battery module 120, a portion of the air dried by the moisture remover 112 may be mixed with oxygen emitted from the pump 36. For example, a valve 37 may be disposed between the moisture remover 112 and the pump 36, and the controller 150 may control the valve 37 to adjust the oxygen concentration in the air supplied to the battery module 120.

Figure 8:
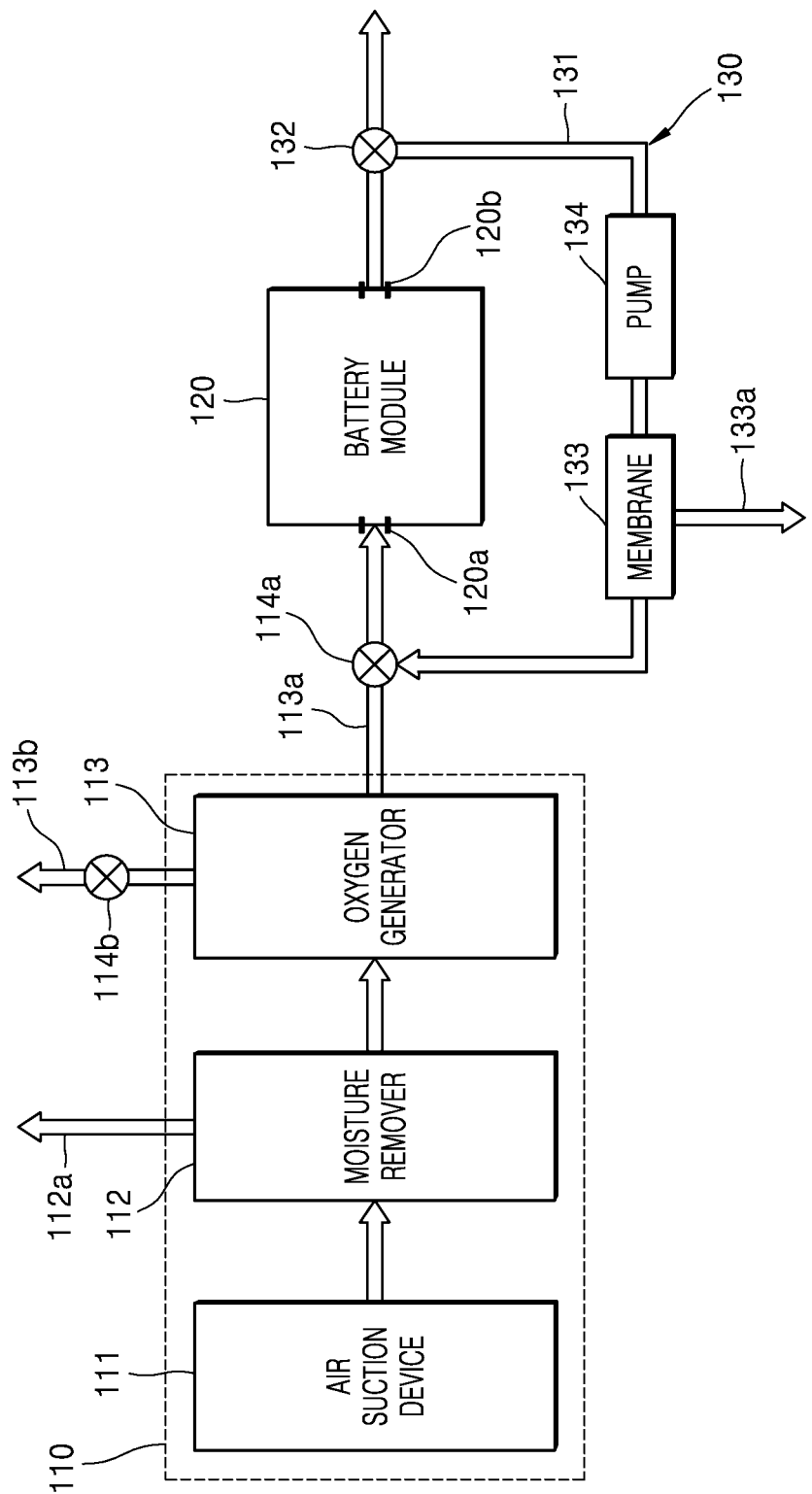
FIG. 8 is a schematic block diagram of an air supplier and an air recirculator of the electrochemical battery illustrated in FIG. 1, according to another embodiment.

FIG. 8 is a schematic block diagram of an air supplier 110 and an air recirculator 130 of the electrochemical battery 100 illustrated in FIG. 1, according to another embodiment. Referring to FIG. 8, the air recirculator 130 may further include a membrane 133 configured to separate oxygen from air exhausted through an air outlet port 120b of a battery module 120. The membrane 133 may be substantially the same as the membrane 35 illustrated in FIG. 7. For example, the membrane 133 may be disposed within an air flow passage 131. Therefore, the membrane 133 may separate only oxygen from air which is exhausted though the air outlet port 120b of the battery module 120 and is recirculated along the air flow passage 131. The oxygen, which is separated by the membrane 133, may continuously flow along the air flow passage 131 to be supplied to the battery module 120 through an air inlet port 120a. Air from which the oxygen has been filtered out by the membrane 133, e.g., primarily nitrogen, may be exhausted to the outside through an outlet port 133a.

In the case of the present embodiment, since the oxygen in the air exhausted through the air outlet port 120b is separated by the membrane 133 within the air flow passage 131, connection of the air flow passage 131 to an oxygen generator 113 can be omitted. As illustrated in FIG. 8, the air flow passage 131 may be connected between the air inlet port 120a and the air outlet port 120b of the battery module 120. For example, a first end portion of the air flow passage 131 may be connected to the air outlet port 120b, and a second end portion thereof may be connected to a first valve 114a or be directly connected to the air inlet port 120a. In this case, the air flow passage 131 may directly transfer the air exhausted through the air outlet port 120b to the air inlet port 120a. The air exhausted through the air outlet port 120b and air supplied through the oxygen generator 113 may be mixed to each other in the air inlet port 120a and be supplied to the battery module 120.

In addition, in order to improve oxygen separation efficiency of the membrane 133 and allow air to smoothly flow in the air flow passage 131, the air recirculator 130 may further include a pump 134. For example, the pump 134 may be disposed on the air flow passage 131 between the air outlet port 120b and the membrane 133 and may allow air to flow from the air outlet port 120b to the air inlet port 120a.

Since the above-described electrochemical battery 100 maintains the oxygen concentration in the air supplied to the battery module 120 to a range greater than a range of an oxygen concentration in the atmosphere, the performance of the electrochemical battery 100 is improved. Also, a reduction in performance of the electrochemical battery 100, which is caused by a low oxygen concentration, may be prevented, and degradation of a cathode material, which is caused by an excessively high oxygen concentration may be avoided. In addition, according to embodiments, the electrochemical battery 100 may constantly and efficiently maintain the oxygen concentration in the battery module 120 by recirculating the air exhausted from the battery module 120. That is, since oxygen, which does not participate in a reaction within the battery module 120 and is exhausted therefrom is reused, it may be possible to reduce the amount of air supplied to the battery module 120 from the outside. Therefore, it may be possible to reduce an amount of electric power consumed for supplying air to the battery module 120, for example, electric power consumed by the air suction device 111, the moisture remover 112, and the oxygen generator 113.

Figure 9:
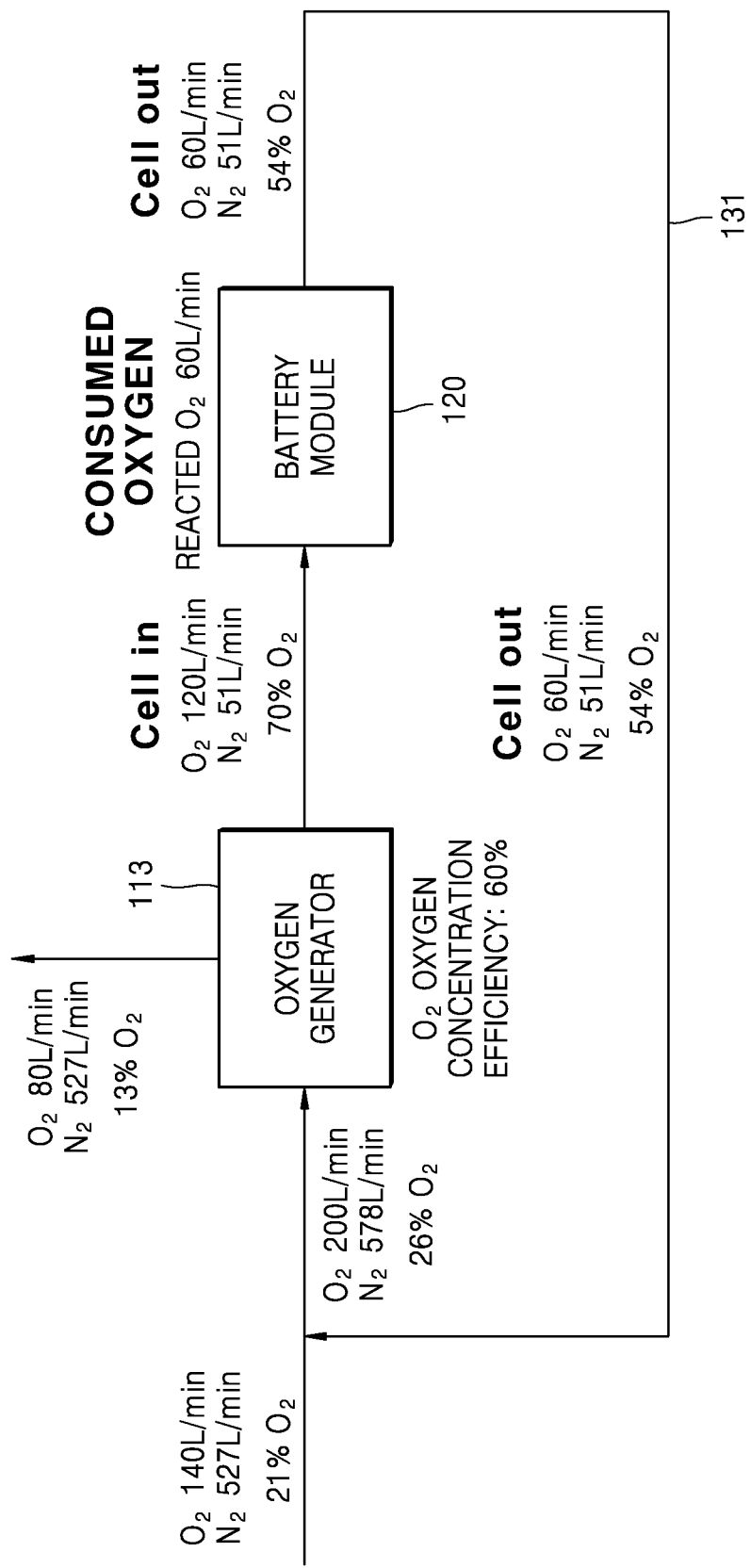
FIG. 9 is a diagram for illustrating a reduction in an air amount supplied from the outside by using the air recirculator in a structure of the air supplier and the air recirculator illustrated in FIG. 5 in an embodiment in which the battery module is a metal air battery cell.

FIG. 9 is a diagram illustrating that it is possible for an air amount supplied from the outside to be decreased by using the air recirculator 130 in a structure of the air supplier 110 and the air recirculator 130 illustrated in FIG. 5 in a case where the electrochemical cell of the battery module 120 is, for example, the metal air cell. In an example of FIG. 9, it is assumed that an oxygen amount used for a reaction within the battery module 120 is about 60 liters per minute (L/min), and it is assumed that the controller 150 maintains an oxygen concentration in air supplied to the battery module 120 at about 70%. In addition, it is assumed that a proportion of an amount of oxygen actually introduced to the battery module 120 to an oxygen amount used in the battery module 120 is about two. That is, when the oxygen amount used for the reaction within the battery module 120 is about 60 L/min, about 120 L/min of oxygen may be supplied to the battery module 120. It is assumed that oxygen concentration efficiency of the oxygen generator 113 is about 60%, and it is assumed that all of gases except for oxygen in air are nitrogen.

Referring to FIG. 9, the air supplied through the air inlet port 120a of the battery module 120 may include about 120 L/min of oxygen and about 51 L/min of nitrogen. Since the battery module 120 consumes about 60 L/min of oxygen during an operation, air exhausted through the air outlet port 120b may include about 60 L/min of oxygen and about 51 L/min of nitrogen. In this case, an oxygen concentration in the air exhausted through the air outlet port 120b may be about 54%. All of the air exhausted through the air outlet port 120b may be transferred to the oxygen generator 113 through the air flow passage 131. In order to extract about 120 L/min of oxygen, the oxygen generator 113 having oxygen concentration efficiency of about 60% may use about 200 L/min of oxygen. Since about 60 L/min of oxygen is supplied through the air flow passage 131, the air suction device 111 additionally supplies about 140 L/min of oxygen to the oxygen generator 113. For example, since an oxygen concentration in the atmosphere is 21%, the air suction device 111 may suction about 140 L/min of oxygen and about 527 L/min of nitrogen from the outside, the moisture remover 112 may remove moisture from the suctioned air, and then, the moisture-removed air may be supplied to the oxygen generator 113. Accordingly, the whole air supplied to the oxygen generator 113 may include about 200 L/min of oxygen and about 578 L/min of nitrogen. After that, in order to maintain the oxygen concentration in the air supplied to the battery module 120 to about 70%, the oxygen generator 113 may exhaust about 80 L/min of oxygen and about 120 L/min of nitrogen to the outside and supply 120 L/min of oxygen and 51 L/min of nitrogen to the battery module 120 under control of the controller 150.

As can be seen from an example of FIG. 9, when the air exhausted from the battery module 120 is recirculated by using the air recirculator 130, the air suction device 111 suctions about 667 L/min of air (about 140 L/min of oxygen and about 527 L/min of nitrogen). On the contrary, when the air exhausted from the battery module 120 is not recirculated, in order to supply about 200 L/min of oxygen to the oxygen generator 113, the air suction device 111 suctions about 952 L/min of air (about 200 L/min of oxygen and about 752 L/min of nitrogen). About 752 L/min of nitrogen is calculated by assuming that an oxygen concentration in the atmosphere is 21%. Therefore, an amount of the air suctioned by the air suction device 111 may be reduced by about 30% by recirculating the air exhausted from the battery module 120, and a load of the air suction device 111 and the moisture remover 112 may be reduced by about 30%.

Figure 10:
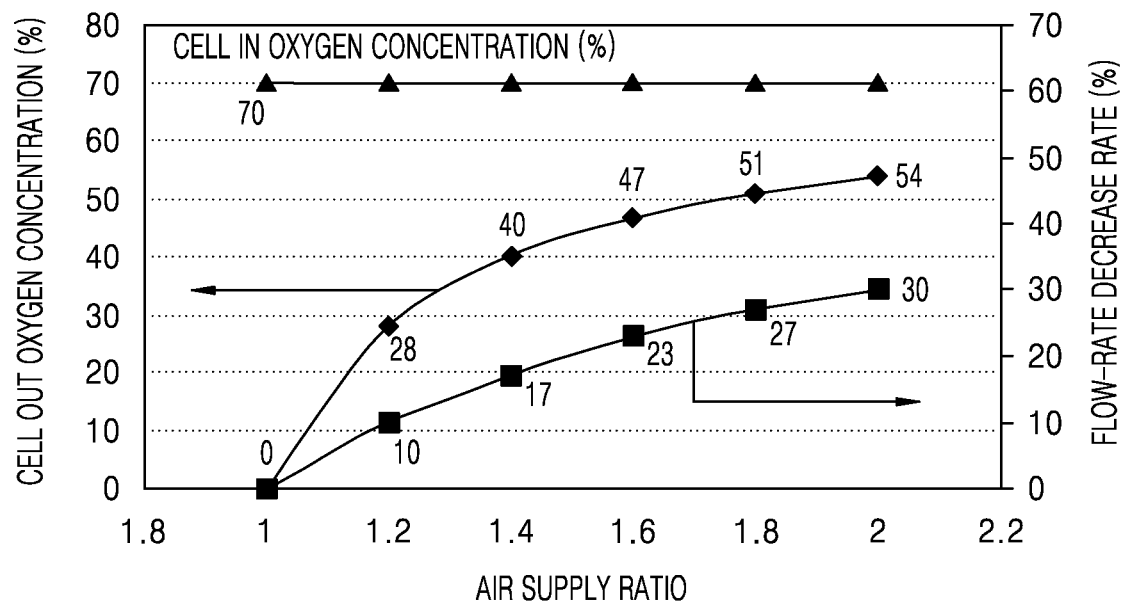
FIG. 10 is a graph showing a decrease of an air supply flow-rate (percent, %) and an oxygen concentration of air exiting the metal air battery (percent, %) according to an air supply ratio of an oxygen amount actually introduced into a battery module to an oxygen amount used in the battery module when an oxygen concentration in air supplied to the battery module is fixed to a constant value.

FIG. 10 is a graph showing a decrease of an air supply flow rate and an oxygen concentration of air exiting the metal air battery according to an air supply ratio of an oxygen amount actually introduced into the battery module 120 to an oxygen amount used in the battery module 120 when an oxygen concentration in air supplied to the battery module 120 is fixed at a constant value in a case where the electrochemical battery cell of the battery module 120 is, for example, the metal air cell. For example, in a case where the oxygen amount used in the battery module 120 is about 60 L/min, when about 60 L/min of oxygen is supplied, the air supply ratio may be about one. When the air supply ratio is about one, the oxygen supplied to the battery module 120 may be completely consumed. Accordingly, the oxygen concentration in the air exhausted from the battery module 120 may be about 0%. Therefore, an air supply flow rate may not be decreased in the air suction device 111. Referring to the graph of FIG. 10, as the air supply ratio of the oxygen amount actually introduced into the battery module 120 to the oxygen amount used in the battery module 120 is increased, the oxygen concentration in the air exhausted from the battery module 120 may be further increased, and the air supply flow rate may be further decreased in the air suction device 111.

Figure 11:
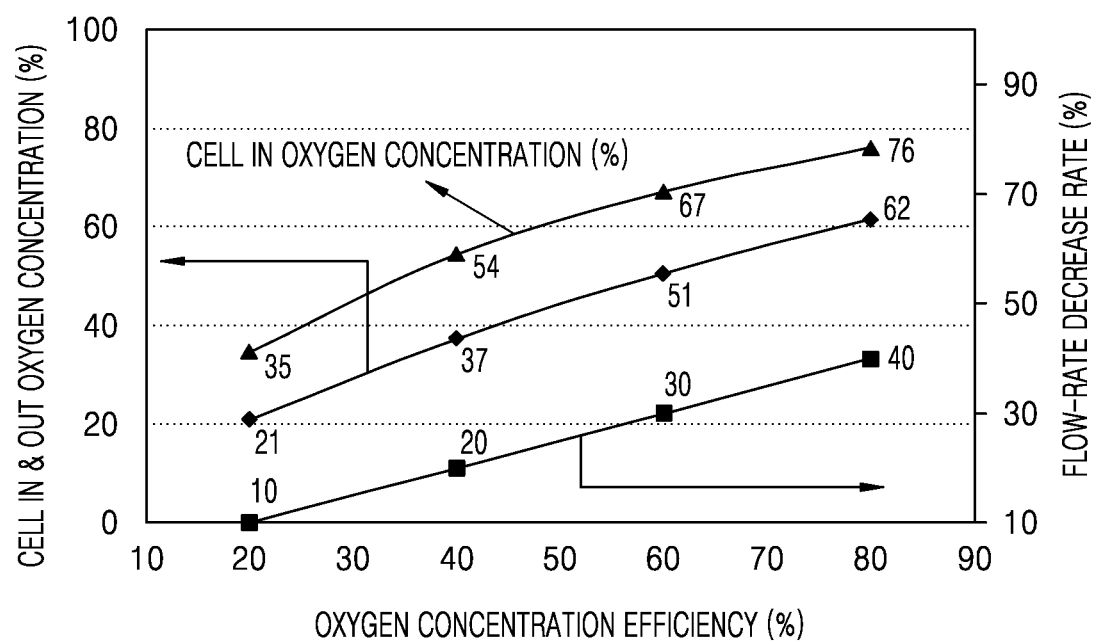
FIG. 11 is a graph showing a decrease of an air supply flow rate (percent, %), an oxygen concentration of the air supplied to the battery module, and an oxygen concentration of air exiting the battery module according to oxygen concentration efficiency in an oxygen generator when a proportion of an oxygen amount actually introduced into a battery module to an oxygen amount demanded by the battery module is fixed to a constant value.

FIG. 11 is a graph showing a decrease of an air supply flow rate, an oxygen concentration of the air supplied to the battery module, and an oxygen concentration of air exiting the battery module according to oxygen concentration efficiency in the oxygen generator 113 when an air supply ratio of an oxygen amount actually introduced into the battery module 120 to an oxygen amount used in the battery module 120 is fixed to a constant value in a case where the electrochemical battery cell of the battery module 120 is, for example, the metal air cell. In the graph of FIG. 11, it is assumed that the proportion of the oxygen amount actually introduced to the battery module 120 to the oxygen amount used in the battery module 120 is about two. Referring to FIG. 11, as the oxygen concentration efficiency of the oxygen generator 113 is increased, the oxygen concentration in the air supplied to the battery module 120 and the oxygen concentration in the air exhausted from the battery module 120 may be increased, and the air supply flow rate may be decreased in the air suction device 111.

As can be seen from the graphs of FIGS. 10 and 11, when taking into consideration the total efficiency of the electrochemical battery 100, in an embodiment wherein the decrease effect of the air supply flow rate is not great in the air suction device 111, it may be possible to stop recirculating air. That is, in an embodiment wherein the ratio of the oxygen amount actually introduced into the battery module 120 to the oxygen amount used in the battery module 120 is low, in an embodiment wherein the oxygen concentration efficiency of the oxygen generator 113 is low, or in a case where the oxygen concentration in the air exhausted from the battery module 120 is low, the controller 150 may stop recirculating the air by closing the third valve 132. For example, the controller 150 may control the air recirculator 130 to recirculate or not to recirculate the air exhausted from the battery module 120 according to the oxygen concentration in the air exhausted from the battery module 120. Specifically, when the oxygen concentration in the air exhausted from the battery module 120 is less than the oxygen concentration in the atmosphere (i.e., 21%), the controller 150 may control the air recirculator 130 not to recirculate the air exhausted from the battery module 120.

In FIGS. 9 to 11, in the case the electrochemical cell of the battery module 120 is the metal air cell, the effect of recirculating the air exhausted from the battery module 120 by using the air recirculator 130 has been described. Even when the electrochemical cell of the battery module 120 is the fuel cell, the efficiency of the electrochemical battery 100 may be improved by recirculating, to the air recirculator 130, the air exhausted from the battery module 120.

For understanding, embodiments of the electrochemical battery maintaining the oxygen concentration by air recirculation have been described and illustrated in the accompanying drawings. However, it will be understood that the embodiments are examples and shall not limit the scope of this disclosure. It will be understood that the scope of this disclosure is not limited to the illustrations and description provided herein and that various modifications may be made those of ordinary skill in the art.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrochemical battery comprising:
a battery module comprising at least one electrochemical cell;
an air supplier configured to supply air to the battery module and maintain an oxygen concentration in the air that is supplied to the battery module;
an air recirculator configured to recirculate air exhausted from the battery module; and
a controller configured to control the air supplier and the air recirculator,
wherein the battery module comprises
an air inlet port though which air is introduced from the air supplier, and
an air outlet port through which air remaining after a reaction in the at least one electrochemical cell is exhausted, and
wherein the air recirculator is configured to recirculate the air exhausted through the air outlet port of the battery module to the air inlet port of the battery module, and
wherein the controller is configured to maintain the oxygen concentration in the air supplied to the battery module between a value equal to or greater than about 30% and a value less than about 100%.

2. The electrochemical battery of claim 1, wherein
the air recirculator comprises an air flow passage configured to transfer the air exhausted through the air outlet port to the air supplier, and
the air supplier comprises:
an air suction device configured to suction air from the outside, and
an oxygen generator configured to generate oxygen by separating oxygen from the air.

3. The electrochemical battery of claim 2, wherein
the air flow passage connects the air outlet port of the battery module and the oxygen generator.

4. The electrochemical battery of claim 2,
wherein the air supplier further comprises a moisture remover configured to remove moisture from the suctioned air,
wherein the air supplier is configured to mix the air dried by the moisture remover and the air exhausted from the battery module, and
wherein the air supplier is configured to supply the mixed air dried by the moisture remover and the air exhausted from the battery module to the oxygen generator.

5. The electrochemical battery of claim 2, wherein
the oxygen generator is further configured to filter oxygen via an adsorption/desorption method or a membrane method.

6. The electrochemical battery of claim 5, wherein
the adsorption/desorption method comprises at least one selected from a pressure swing adsorption method, a thermal swing adsorption method, a pressure thermal swing adsorption method, and a vacuum swing adsorption method.

7. The electrochemical battery of claim 2, wherein
the oxygen generator comprises:

a first outlet port connected to the battery module and configured to supply the separated oxygen to the battery module; and a second outlet port configured to exhaust an exhaust gas remaining after oxygen is separated from the suctioned air.

8. The electrochemical battery of claim 7, wherein the air supplier is further configured to reflux at least a portion of a gas exhausted through the first outlet port to the oxygen generator.

9. The electrochemical battery of claim 8,
wherein the air supplier further comprises a moisture remover configured to remove moisture from the suctioned air,
wherein the air supplier is further configured to mix the refluxed air with the air dried by the moisture remover and the air exhausted from the battery module, and
wherein the air supplier is configured to supply the mixed air to the oxygen generator.

10. The electrochemical battery of claim 1, wherein the air recirculator comprises an air flow passage configured to directly transfer the air exhausted through the air outlet port to the air inlet port.

11. The electrochemical battery of claim 10,
wherein the air recirculator further comprises a membrane disposed on the air flow passage, and
wherein the membrane is configured to separate oxygen from the air that is exhausted through the air outlet port and is recirculated to the air inlet port.

12. The electrochemical battery of claim 11, wherein the membrane is configured to supply the separated oxygen to the air inlet port and is configured to an exhaust gas to an outside.

13. The electrochemical battery of claim 11,
wherein the air recirculator further comprises an air pump disposed on the air flow passage, and
wherein the air pump is configured to allow air to flow from the air outlet port to the air inlet port.

14. The electrochemical battery of claim 11, wherein the air recirculator further comprises a valve configured to open or close the air flow passage.

15. The electrochemical battery of claim 1,
wherein the controller is configured to control the oxygen concentration in the air supplied to the battery module to maintain the oxygen concentration of the battery module 120 to a preset specific value.

16. The electrochemical battery of claim 15,
wherein the controller controls the air supplier and the air recirculator, and
wherein the controller is configured to maintain the oxygen concentration in the air supplied to the battery module in a range between a value equal to or greater than about 30% and a value less than 95%, based on a total content of the air supplied to the battery module.

17. The electrochemical battery of claim 15, further comprising an oxygen sensor configured to measure at least one selected from the oxygen concentration in the air supplied to the battery module, an oxygen concentration in the battery module, and the oxygen concentration in the air exhausted from the battery module.

18. The electrochemical battery of claim 17, wherein
when the oxygen concentration in the battery module is less than a preset concentration, the controller controls the air supplier to increase the oxygen concentration in the air supplied to the battery module, and when the oxygen concentration in the battery module is greater than the preset concentration, the controller controls the air supplier to decrease the oxygen concentration in the air supplied to the battery module.

19. The electrochemical battery of claim 17, wherein the controller controls the air recirculator to recirculate or not to recirculate the air exhausted from the battery module according to the oxygen concentration in the air exhausted from the battery module.

20. The electrochemical battery of claim 19, wherein
when the oxygen concentration in the air exhausted from the battery module is less than an oxygen concentration of atmospheric air, the controller controls the air recirculator to not recirculate the air exhausted from the battery module.

21. The electrochemical battery of claim 20, wherein the air recirculator comprises:
an air flow passage configured to transfer the air exhausted though the air outlet port to the air supplier; and
a valve configured to open or close the air flow passage.

22. The electrochemical battery of claim 1, wherein
the battery module comprises at least one metal air cell configured to use oxygen in air as a cathode active material, or
at least one fuel cell configured to change chemical energy of a fuel into electrical energy through an electrochemical reaction.

23. A method of operating an electrochemical battery comprising
a battery module comprising at least one electrochemical cell,
an air supplier configured to supply air to the battery module and maintain an oxygen concentration in the air that is supplied to the battery module, and
an air recirculator configured to recirculate air exhausted from the battery module, wherein the battery module comprises
an air inlet port though which air is introduced from the air supplier, and
an air outlet port through which air remaining after a reaction in the at least one electrochemical cell is exhausted, the method comprising:
recirculating air exhausted through the air outlet port of the battery module to the air inlet port of the battery module to operate the electrochemical battery and maintain the oxygen concentration in the air supplied to the battery module between a value equal to or greater than about 30% and a value less than about 100%.

24. The method of claim 23, wherein the recirculating further comprises
comparing an oxygen concentration measured by an oxygen sensor with a target oxygen concentration, and
selecting an amount of recirculated air based on the comparing of the oxygen concentration measured by an oxygen sensor with the target oxygen concentration.

25. The electrochemical battery of claim 1, wherein the controller is configured to maintain the oxygen concentration in the air supplied to the battery module between equal to or about 35% and less than about 95%.

26. The electrochemical battery of claim 1, wherein the controller is configured to maintain the oxygen concentration in the air supplied to the battery module between equal to or about 50% and about 80%.

* * * * *